UNITED STATES PATENT OFFICE.

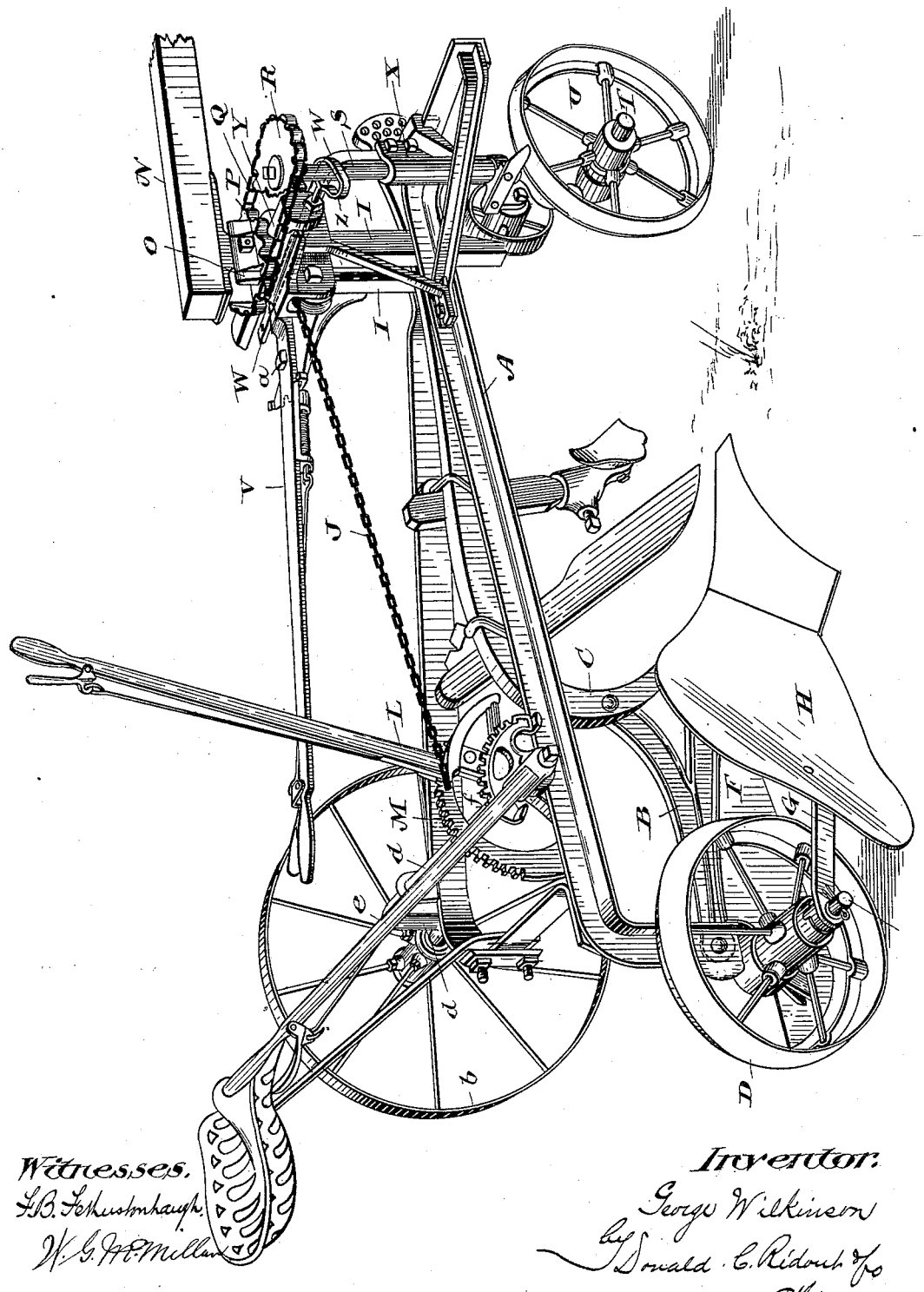

GEORGE WILKINSON, OF AURORA, ONTARIO, CANADA.

SULKY-PLOW.

SPECIFICATION forming part of Letters Patent No. 427,942, dated May 13, 1890.

Application filed March 28, 1889. Renewed January 8, 1890. Serial No. 336,253. (No model.)

*To all whom it may concern:*

Be it known that I, GEORGE WILKINSON, manufacturer of agricultural implements, of the village of Aurora, in the county of York, in the Province of Ontario, Canada, have invented a certain new and useful Improvement in Sulky-Plows, of which the following is a specification.

The object of the invention is to design a strong and easily-managed sulky-plow; and it consists, essentially, in making the frame of the machine of angle-steel suitably supported by wheels and provided with a simple arrangement of levers, by which the necessary motions of the plow can be controlled by the driver without descending from his seat.

The figure is a perspective view of my improved sulky-plow.

A represents the frame, which is made of angle-steel, shaped substantially as shown, the side of the frame parallel with the draft being bent downwardly at its rear end to pivot on the Y-brace B, the bifurcated ends of which are bolted to the plow-beam C. The rear wheel D is suitably journaled, its spindle E being supported on one end by a bearing formed on the rear of the landside F, and on its other end by a brace G, extending from the mold-board H. The front end of the plow-beam C is placed between the posts I, which are rigidly secured to the angle-frame A. The front end of the plow-beam C is placed between the posts I, which are rigidly secured to the angle-frame A. The chain J passes over a sheave-pulley K, and one end is connected to the plow-beam C, while its other end is attached to the pivoted lever L. This lever L is arranged in connection with a suitable toothed quadrant M, so that by the adjustment of the said lever the plow-beam C may be raised or lowered and held at any desired angle. The tongue N is hinged on a bracket O, which is fixed to or forms part of a sprocket-wheel P, and is journaled in a suitable sliding head-block Y, carried in suitable guides formed in a bracket on top of the post I, so that the said tongue may be swiveled horizontally in order to turn and guide the plow. A sprocket-chain Q passes around the wheel P and around a corresponding sprocket-wheel R, fixed to the top end of the spindle S, which is crank-shaped at its bottom end and carries the spindle T, on which the wheel U is journaled. The lever V is pivoted at *a*, and also to the sliding bar W, supported in suitable guides on the post I. This bar W is bent downwardly, and is bolted to the bracket X, in which the spindle S is journaled, and which bracket is supported on the right-angled portion of the frame A. The sliding head-block Y, which carries the tongue and its gearing, is connected to the spindle S by the eyebolt Z. It follows, then, that when the lever V is adjusted so as to move the sliding bar W the head-block Y is simultaneously moved, the tongue N and the wheel U being thus simultaneously adjusted by means of the lever V, so as to suit any desired width of furrow. The wheel *b* is journaled on the end of the crank-shaft *d*, which crank-shaft is carried in suitable bearings formed in brackets attached to the angle-frame A, and has fixed to its inner end the lever *e*. This lever *e* is provided with an ordinary toothed quadrant *f*, so that by adjusting the lever the crank-shaft *d* is turned, and in this manner the wheel *b* is raised or lowered, as desired.

What I claim as my invention is—

1. A frame formed of angle-steel shaped substantially as shown, the side of the frame parallel with the draft being bent downwardly to pivot on the end of the Y-brace B, the front end of the said side being bent horizontally at right angles to form a support for the adjustable bracket X, in which the spindle S is journaled, substantially as and for the purpose specified.

2. A frame formed of angle-steel shaped substantially as shown, the side of the frame parallel with the draft being bent downwardly to pivot on the end of the Y-brace B, bolted to the plow-beam C, in combination with the chain J, connected at one end to the front of the plow-beam C, the sheave-pulley K, to support and guide the chain, and the pivoted lever L, with its toothed quadrant M, to adjust the chain for the purpose of raising or lowering the front end of the plow-beam, substantially as and for the purpose specified.

3. The combination of the lever V, pivoted at *a* and to the sliding bar W, and the adjustable bracket X, in which the spindle is journaled, substantially as and for the purpose specified.

4. The adjustable bracket X, supported on the frame A and forming a journal for the spindle S, connected to the spindle of the wheel U, the sprocket-wheel R, fixed to the spindle S and connected to the sprocket-wheel P by the chain Q, in combination with the pivoted lever V, connected to the bracket X by the sliding bar W, and of the head-block Y, supporting the sprocket-wheel P and connected to the spindle S by the eyebolt Z, substantially as and for the purpose specified.

Toronto, March 9, 1889.

GEORGE WILKINSON.

In presence of—
CHARLES C. BALDWIN,
CHAS. H. RICHES.